US012421049B2

(12) United States Patent
Dale et al.

(10) Patent No.: US 12,421,049 B2
(45) Date of Patent: Sep. 23, 2025

(54) SUPPORT LINK FOR A CONVEYOR BELT (71) Applicant: DALE HOLDINGS (PTY) LTD, Cosmo (ZA)

(72) Inventors: Christopher Dale, Pretoria (ZA); Francois Kriel, Johannesburg (ZA); Lyle Ramsay, Centurion (ZA)

(73) Assignee: DALE HOLDINGS (PTY) LTD, Cosmo (ZA)

( * ) Notice: Subject to any disclaimer, the term of this patent is extended or adjusted under 35 U.S.C. 154(b) by 143 days.

(21) Appl. No.: 18/273,489

(22) PCT Filed: Jan. 20, 2022

(86) PCT No.: PCT/IB2022/050460
§ 371 (c)(1),
(2) Date: Jul. 20, 2023

(87) PCT Pub. No.: WO2022/157654
PCT Pub. Date: Jul. 28, 2022

(65) Prior Publication Data
US 2024/0092585 A1    Mar. 21, 2024

(30) Foreign Application Priority Data
Jan. 20, 2021   (ZA) .................................. 2021/00410

(51) Int. Cl.
*B65G 21/18*    (2006.01)
*B65G 17/08*    (2006.01)
*B65G 23/14*    (2006.01)

(52) U.S. Cl.
CPC ........... *B65G 21/18* (2013.01); *B65G 17/086* (2013.01); *B65G 23/14* (2013.01); *B65G 2207/44* (2013.01)

(58) Field of Classification Search
CPC ...... B65G 21/18; B65G 17/086; B65G 23/14; B65G 2207/44
(Continued)

(56) References Cited

U.S. PATENT DOCUMENTS 4,565,282 A    1/1986  Olsson et al.
5,191,267 A *  3/1993  Machacek ............. B65G 21/18
                                                            318/67

(Continued)

OTHER PUBLICATIONS

PCT/IB2022/050460, International Search Report and Written Opinion dated Apr. 12, 2022, 11 pages.

*Primary Examiner* — Gene O Crawford
*Assistant Examiner* — Lester Ill Rushin
(74) *Attorney, Agent, or Firm* — Cozen O'Connor (57) ABSTRACT A support link for a self-stacking spiral conveyor belt, which includes a carrier on which a self-stacking spiral conveyor belt is supportable, a set of orthogonally arranged rolling elements connected to the carrier, in use to guide the carrier along a conveyor path and an interlink mountable onto the carrier. The interlink is connectable to a matched interlink of an adjacent support link through couplers disposed on opposing ends thereof, whereby the connection of a plurality of support links results in a support chain. Furthermore, there is provided a supporting frame defining the conveyor path on which the support chain is movable and a motor driving the support chain by means of a drive gear, which interacted with a drive interface disposed on each support link.

19 Claims, 11 Drawing Sheets (58) Field of Classification Search
USPC .......................................................... 198/778
See application file for complete search history.

(56) References Cited

U.S. PATENT DOCUMENTS

| | | | | |
|---|---|---|---|---|
| 7,374,035 | B2* | 5/2008 | Olsson | F16C 29/04 |
| | | | | 198/779 |
| 10,549,929 | B2* | 2/2020 | Bretz | B65G 47/646 |
| 12,286,303 | B2* | 4/2025 | Van Faassen | B65G 17/064 |
| 2005/0092585 | A1 | 5/2005 | Nelson et al. | |
| 2018/0319599 | A1 | 11/2018 | Billman et al. | |
| 2020/0130946 | A1* | 4/2020 | Morey | B65G 23/14 |
| 2020/0283031 | A1 | 9/2020 | Bengtsson et al. | |

* cited by examiner

SUPPORT LINK FOR A CONVEYOR BELT

CROSS-REFERENCE TO RELATED APPLICATIONS

This application is a 371 entry of International Application No. PCT/IB2022/050460, filed Jan. 20, 2022, which claims priority to South African Patent Application No. 2021/00410, filed Jan. 20, 2021. The aforementioned applications are incorporated herein by reference in their entireties.

FIELD OF THE INVENTION

This invention relates to a support link for a conveyor belt. In particular, the invention relates to a support link, a support chain, and a conveyor belt supporting installation.

BACKGROUND OF THE INVENTION

Spiral self-stacking conveyor belt systems are generally used in the thermal processing of foodstuffs. The conveyor belt is arranged in a helical path, with a supporting structure supporting the base circular path of the conveyor belt, and upper sections of the conveyor belt being supported by the conveyor belt sections below it. The conveyor belt is driven by a drive chain on the outer and inner edge of the conveyor belt.

The inventors identified a need for an improved support link which, when a plurality are connected together, provides a drive chain which carries the conveyor belt along its base circular path.

SUMMARY OF THE INVENTION

A support link for a self-stacking spiral conveyor belt, which includes
 a carrier on which a self-stacking spiral conveyor belt is supportable;
 a set of orthogonally arranged rolling elements, connected to the carrier, in use to guide the carrier along a conveyor path; and
 an interlink, mountable onto the carrier and connectable to a matched interlink of an adjacent support link.

The interlink may include at least one coupler such that the interlink is connectable to the matched interlink of an adjacent support link.

Each rolling element of the set of orthogonally arranged rolling elements, may comprise of a pair of co-axial rollers.

The rolling elements may be connected to the carrier via the interlink.

A rotational axis of a first pair of rollers may be perpendicular to a longitudinal length of the carrier. A rotational axis of a second pair of rollers may be perpendicular to both the rotational axis of the first pair of rollers and the longitudinal length of the carrier.

The support link may further include a guide element for engaging a guide path, in use to retain the support link on the conveyor path. The guide element may extend transversely from the carrier. The guide element may be in the form of a projection. The guide element may include a roller movable in the guide path, for guiding the support link along the conveyor path.

The support link may further include a drive interface. The drive interface may be provided on the carrier.

In one embodiment, the drive interface may be driven by engaging with a driver mechanism.

In another embodiment, the drive interface may be shaped and dimensioned to be driven by a drive gear, to drive the support link along the conveyor path. The drive interface may be in the form of a spigot.

The carrier may be in the form of an inverted substantially U-shaped member, having a planar platform with side walls on two opposed sides extending substantially perpendicularly downwardly from the planar platform. One side wall may extend perpendicularly from an edge of the platform. The opposed side wall may extend perpendicularly inwardly offset from the edge of the platform.

The drive interface may be mounted onto the planar platform. The drive interface may be in the form of a projection extending upwardly from the planar platform. Specifically, the drive interface may be in the form of a cylindrical projection. In use, the drive interface may be driven by a matched drive gear connected to a motor.

The two opposed side walls of the carrier may each include an aperture. The two apertures may be in line with each other to receive a transverse rod there through.

The interlink may be in the form of an elongate member mounted to an underside of the platform of the carrier, in the same longitudinal axis as the carrier, such that the elongate member is positioned between the side walls of the carrier. The elongate member may be positioned parallel to and between the side walls of the carrier.

The interlink may include a transverse aperture, which is positioned in line with the apertures of the side walls. The interlink may be in the form an elongate bar. In particular, the bar may be in the form of a square bar, with a rounded outward bulge around the position of the transverse aperture.

The support link may include an axle extending through the apertures of both sidewalls, the first pair of co-axial rollers and through the aperture of the interlink.

The axle may be in the form of a transverse horizontal axle.

The axle may be fixed to at least one of the sidewalls. The axle may be fixed to at least one of the sidewalls by means of a clip, such as a circlip.

The axle may be fixed to an operative inner sidewall.

In a preferred embodiment, the transverse horizontal axle may extend past an operative outer side wall, to define the guide element, and the roller may be mounted to an end thereof.

The interlink may include a coupler at each end, for connecting to a matched interlink of an adjacent support link. A first end may include a double coupler in the form of two co-axially spaced apart ring members, and the second end may include a single coupler in the form of a single ring member.

The second pair of co-axial rollers may be connected to the first end. One roller may be positioned above one of the circular members and the other roller below the other circular member, such that the double coupler is sandwiched between the two rollers. The rollers and double coupler may be connected via a vertical axle. In, use a single coupler from an adjacent support link is inserted between the two co-axial ring members of the double coupler, and connected via the vertical axle to each other and the pair of rollers.

In use, the single coupler on the second end may be inserted between two co-axial ring members of a double coupler on an adjacent support link, and connected via a vertical axle to each other.

In accordance with a further aspect of the invention, there is provided a support chain for a self-stacking spiral conveyor belt, which includes a plurality of support links as described, connected to each other to form a continuous loop.

The links may be connected by positioning the second end of one support link in between the double coupler of the first end of an adjacent support link, and placing a vertical axle through the first and second end, and through the second pair of co-axial rollers. The axle may be secured by means of a clip. The vertical axle may serve as a pivot point. In use, the support links in the chain can pivot about the vertical axle relative to each other in a horizontal plane, to allow the chain to move along a curved conveyor path.

The support links may be arranged in a chain such that their guide elements are on an operative outer side of the chain, for engaging a guide path. Their first set of rollers may be positioned operatively vertical, to allow them to run on a base of a support frame. Their second set of rollers may be positioned operatively horizontal, to allow them to engage a side wall of a support frame. The platforms of their carriers may be aligned, to allow an edge of a conveyor belt to be supported on an operative inner edge of the platforms.

In accordance with yet a further aspect of the invention, there is provided a conveyor belt supporting installation for a self-stacking spiral conveyor belt, which includes
- at least one support chain as described above, for supporting an edge of a conveyor belt thereon;
- a supporting frame defining a conveyor path, on which the support chain is movable; and
- a motor driving the chain by means of a drive gear which interacts with the drive interface of each support link of the support chain.

The supporting frame defines the conveyor path and is used to support a helically arranged conveyor belt tower or stack. The supporting frame may be in the form of a track having an outer rail and an inner rail spaced from each other to support a conveyor belt between the two rails.

The supporting frame may include a section supporting the base of the helical path of the conveyor belt, and a return section where the motor is located and the support chain is driven.

The supporting installation may include two support chains, one running on the outer rail and the other running on the inner rail.

In use, the side edges of the conveyor belt may be supported by each chain, which in turn runs on the rails of the supporting frame. Each rail may include a base and a guide path defining an outer side wall of each rail. The guide path may be in the form of a lipped C-channel positioned on an operative outer side of the base, in use, in which the guide elements runs, to maintain the support links of the chain on the conveyor path.

The supporting installation may include two motors, each located at the return section of the outer and inner rail respectively, and operable to drive the support chains via a drive gear engaging the drive interfaces of the support links.

The motor on the outer rail may run at a higher speed than the motor on the inner rail, to ensure coherent movement of the conveyor belt.

The invention will now be described, by way of non-limiting example, with reference to the accompanying figures.

FIGURE(S)

In the figures:

FIG. 2.1 shows a single support chain in accordance with the invention;

FIG. 2.2 shows a detailed view of one support link, on the supporting installation, in use the support link would be connected to a plurality of adjacent support links to form the support chain;

In the figures, like reference numerals denote like parts of the invention unless otherwise indicated.

EMBODIMENT OF THE INVENTION

Figure 1:
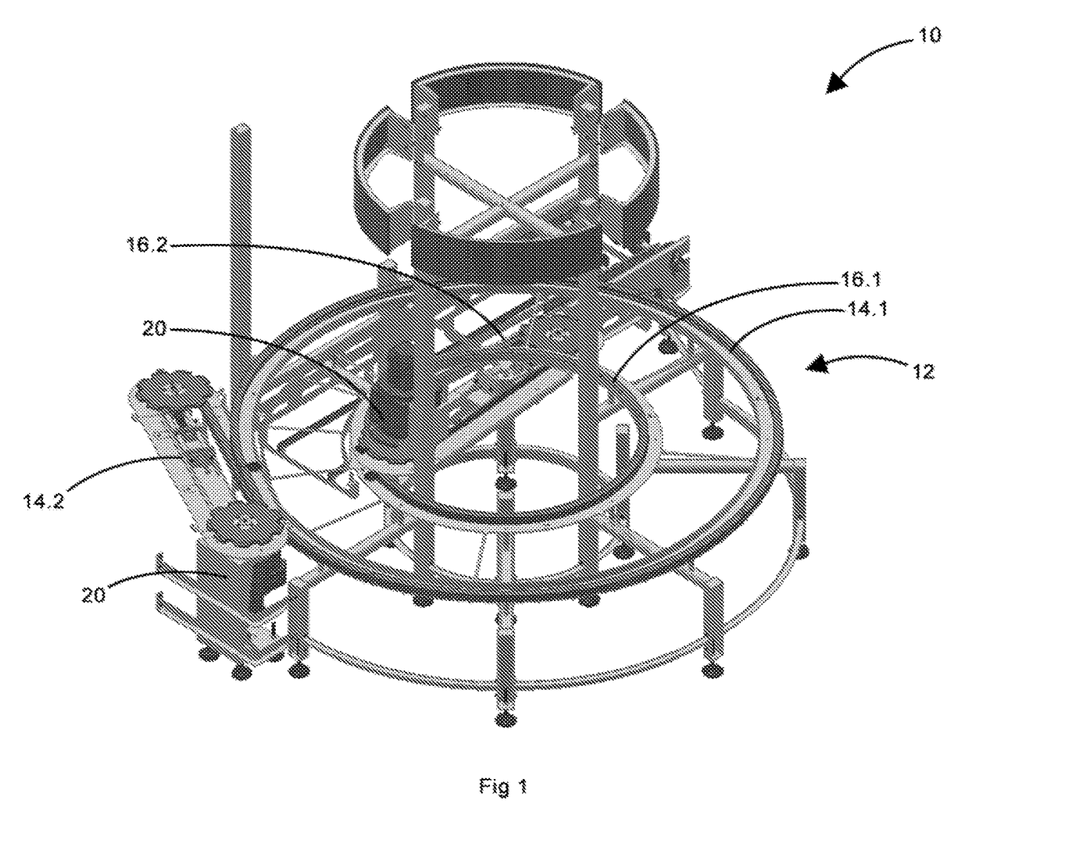
FIG. 1 shows a supporting installation in accordance with one aspect of the invention.

In FIG. 1, reference numeral 10 refers to a conveyor belt supporting installation for a self-stacking spiral conveyor belt.

Figure 3:
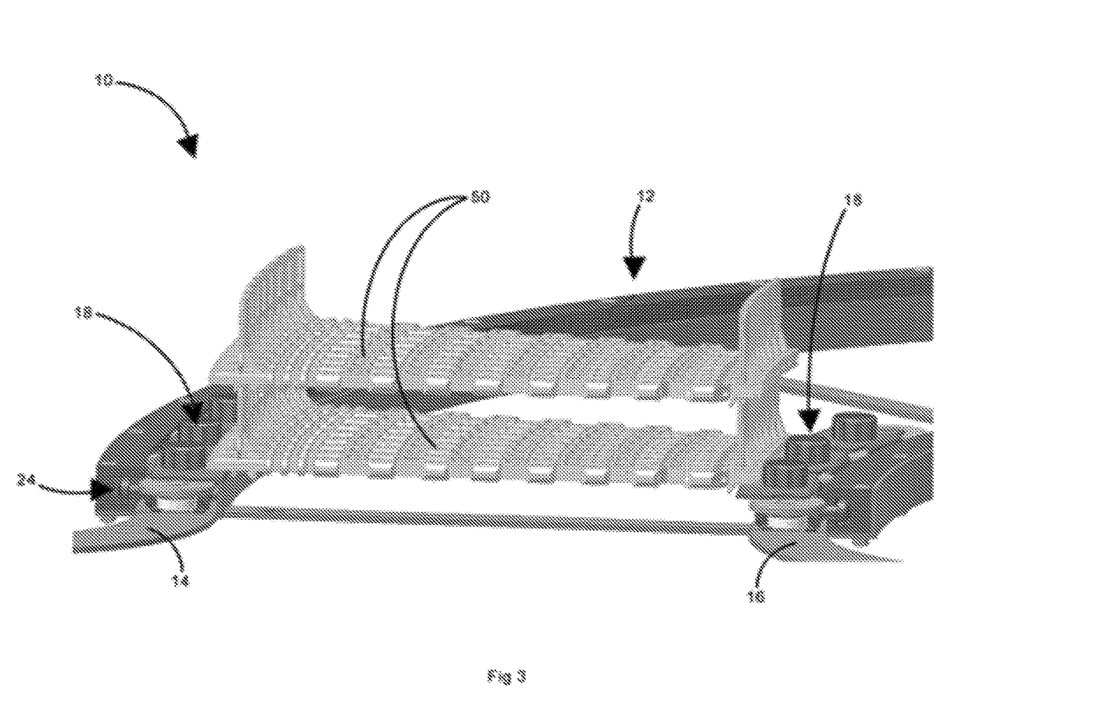
FIG. 3 shows a partial section of a helically arranged conveyor belt tower (stack) supported on the conveyor path of the supporting installation.

The supporting installation (10) includes a supporting frame (12) which is illustrated in FIG. 1. The supporting frame (12) defines a conveyor path and is used to support a helically arranged conveyor belt (50) tower (partially shown in FIG. 3). The supporting frame (12) is in the form of a track having an outer rail (14) and an inner rail (16).

Each rail (14, 16) includes a main section (14.1, 16.1) supporting the base of the helical path of the conveyor belt, and a return section (14.2, 16.2).

Figure 21:
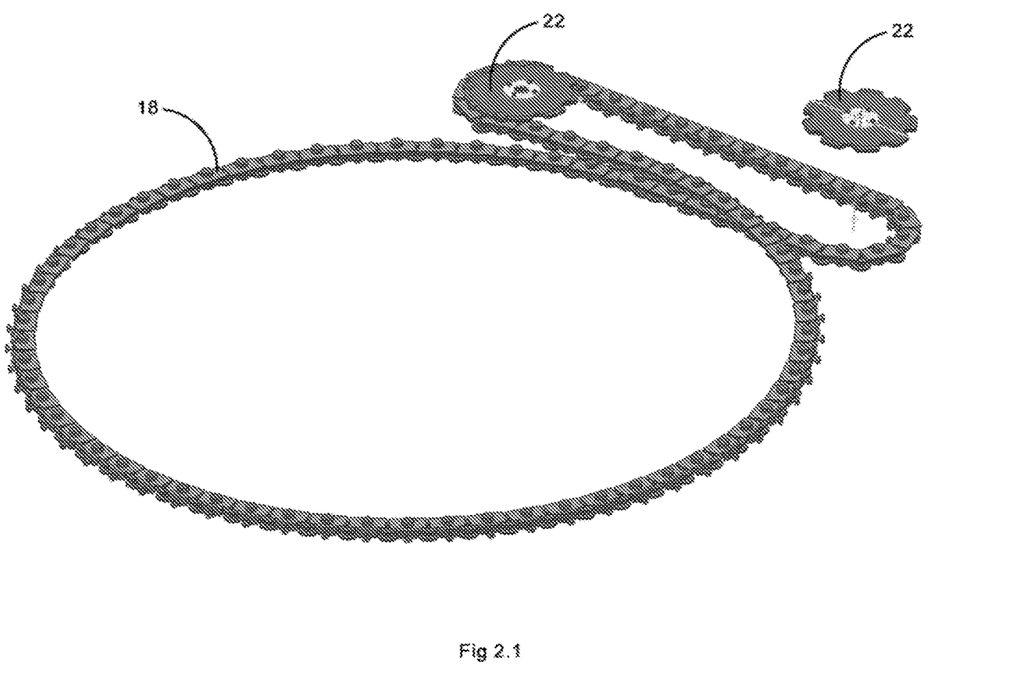
Figure 22:
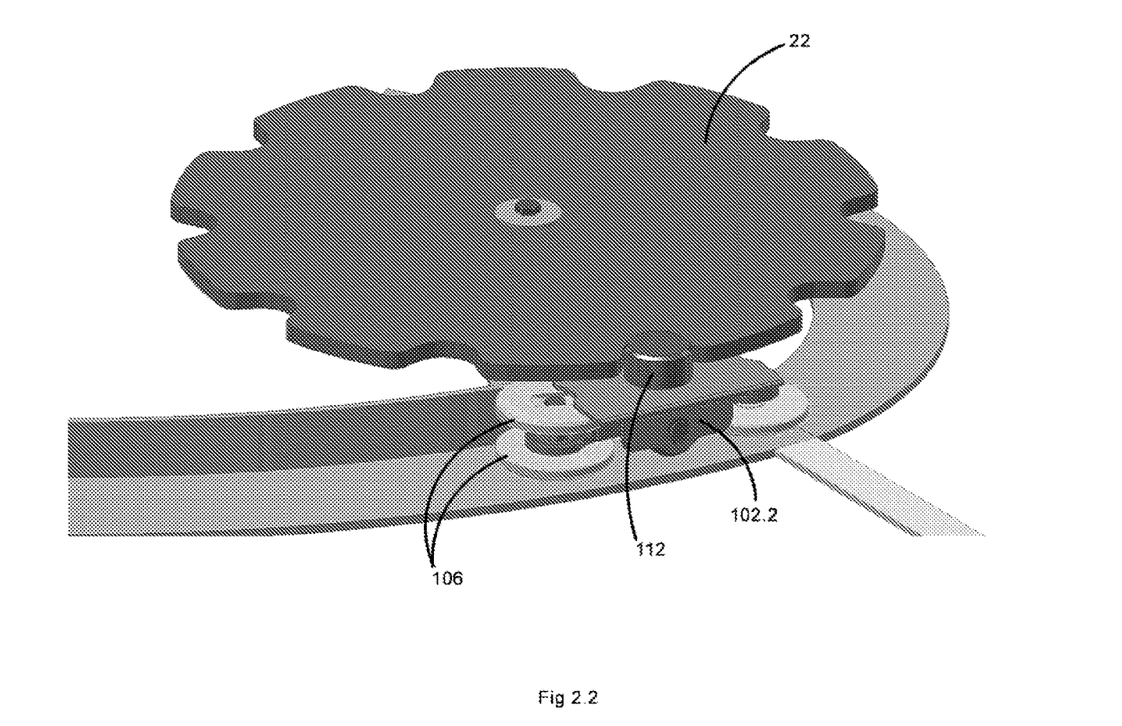

The supporting installation (10) further includes two support chains (18), one running on the outer rail (14) and the other running on the inner rail (16). An example of a single support chain (18) is shown in FIG. 2.

Figure 4:
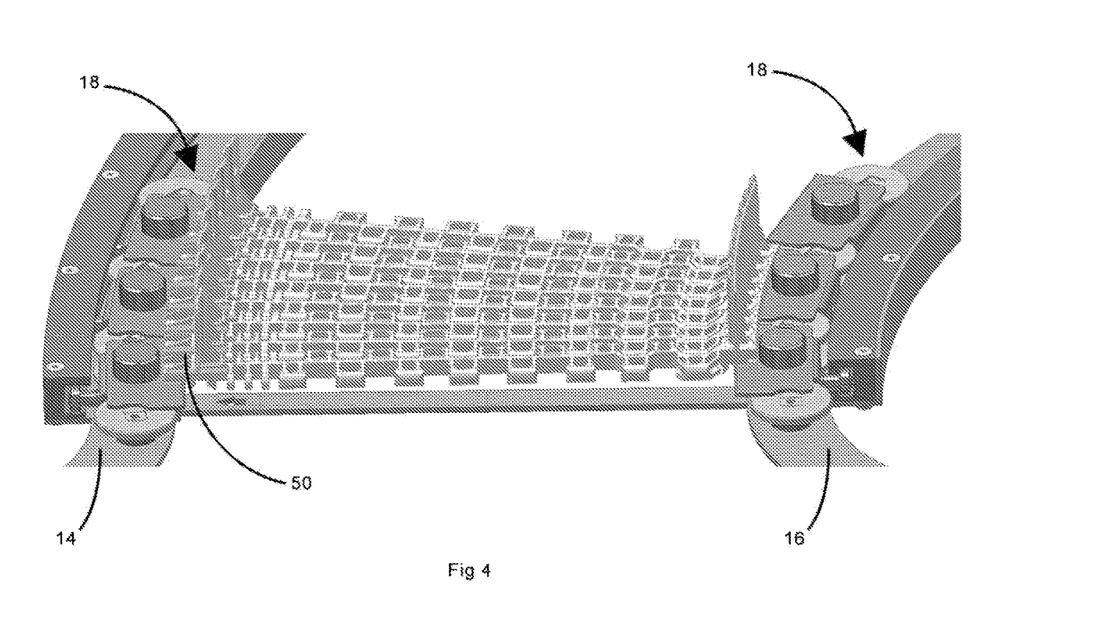
FIG. 4 shows a partial view of the supporting installation supporting the base circular path of the conveyor belt.
Figure 5:
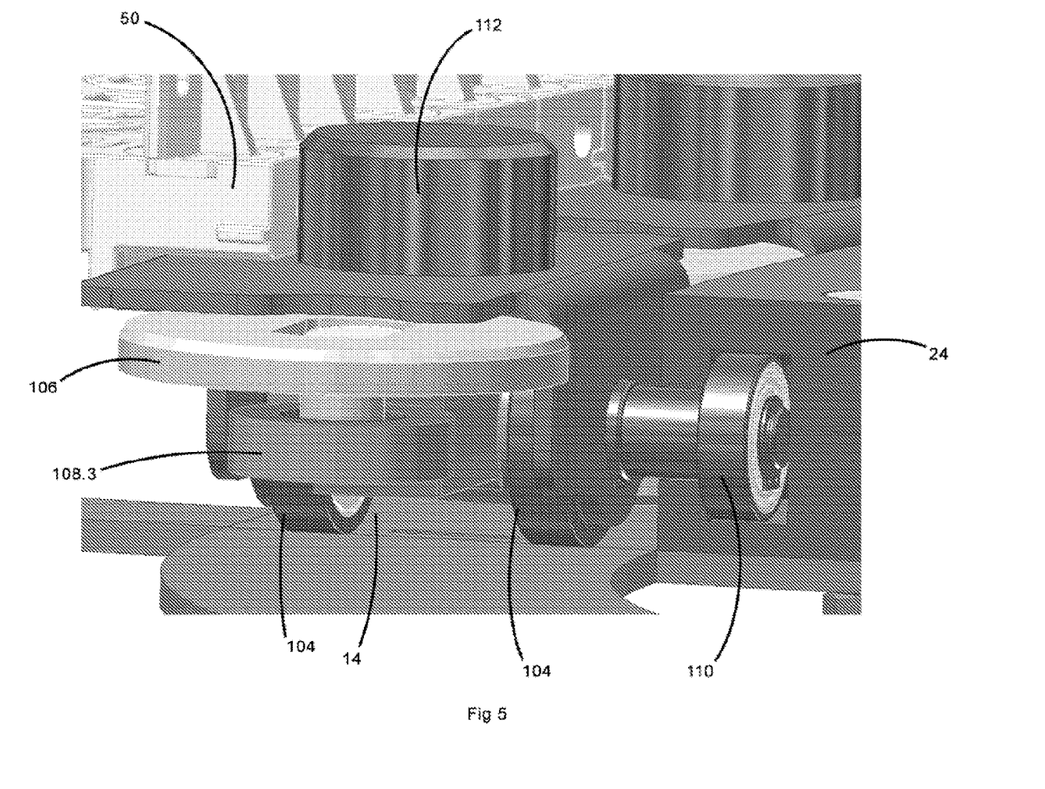
FIG. 5 shows a detailed cut-away view of the support links in the support chain running on the supporting frame, and supporting the conveyor belt.
Figure 6:
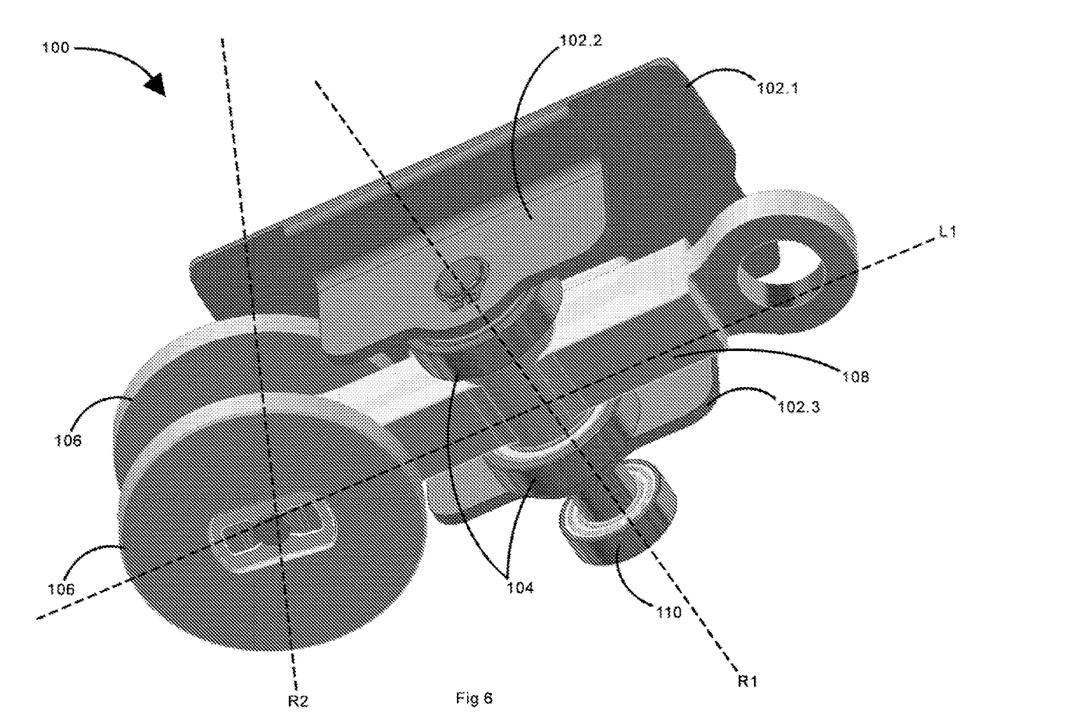
FIG. 6 shows a three-dimensional view of a support link from the bottom.

As best shown in FIGS. 4 and 5, longitudinal side edges of the conveyor belt (50) are supported by each chain (18), which in turn runs on the rails (14, 16) of the supporting frame (12). Each rail (14, 16) includes a base and a guide path (24) defining a side wall of the rail (14, 16). The guide path (24) is in the form of a lipped C-channel positioned on an operative outer side of the base.

The supporting installation (10) further includes two motors (20), each located at the return section of the outer (14.2) and inner rail (16.2) respectively, and operable to drive the support chains (18) via a drive gear (22) as shown in FIG. 2.

Each support chain (18) consists of a plurality of support links (100) connected to each other to form a continuous loop. As best shown in FIGS. 6 to 10, each support link (100) consists of a carrier (102) on which the self-stacking spiral conveyor belt (50) is supportable, a set of orthogonally arranged rolling elements (104, 106), connected to the carrier (102), in use to guide the carrier (102) along the rails (14, 16) of the support frame (12), and an interlink (108) mounted onto the carrier (102) and connectable to a matched interlink (108) of an adjacent support link (100).

Each rolling element (104, 106) of the set of orthogonally arranged rolling elements, comprise a pair of co-axial rollers. The rotational axis (R1) of the first pair of rollers (104) are perpendicular to the longitudinal direction (L1) of the carrier (102). The rotational axis (R2) of the second pair of rollers (106) are perpendicular to both the rotational axis (R1) of the first pair of rollers (104) and the longitudinal direction (L1) of the carrier (102).

The first pair of rollers (104) are in the form of two bearings. The second pair of rollers (106) are in the form of two wheels. The wheels (106) having a larger diameter than the bearings (104). In use, the first pair of rollers (104) run on the bases (14, 16) of the rails, and the second pair of rollers (106) run against the outside of the lipped C-channels of the guide paths (24).

The support link (100) further includes a guide element (110) extending transversely from the interlink (108). The guide element (110) includes a roller movable in the guide path (24), for guiding the support link (100) along the conveyor path. The guide element (110) runs inside the lipped C-channel (24).

The support link further includes a drive interface (112) provided on the carrier (102) and extending upwardly therefrom.

The carrier (102) is in the form of an inverted substantially U-shaped member, having a planar platform (102.1) with side walls (102.2, 102.3) on two opposed sides extending substantially perpendicularly downwardly from the planar platform (102.1). A first side wall (102.3) extends perpendicularly from an edge of the planar platform (102.1) and the opposed second side wall (102.2) extends perpendicularly inwardly offset from the edge of the planar platform (102.1). The side walls (102.2, 102.3) are shorter in length, than the length of the planar platform (102.1), to allow the second pair of rollers (106) to protrude slightly beyond the outline of the carrier (102), such that it can roll against the outside of the lipped C-channels (24).

The drive interface (112) is mounted onto the planar platform (102.1). The drive interface (112) is in the form of a cylindrical projection extending upwardly from the planar platform (102.1). In use, to be driven by the matched drive gear (22) connected to the motor (20).

The two opposed side walls (102.2, 102.3) of the carrier (102) each include an aperture (102.2.1, 102.3.1). The two apertures (102.2.1, 102.3.1) are in line with each other to receive a transverse rod there through.

The interlink (108) is in the form of an elongate member mounted to an underside of the platform (102.1) of the carrier (102), in the same longitudinal axis (L1) as the carrier (102), such that the elongate member is positioned between the side walls (102.2, 102.3) of the carrier (102).

The interlink (108) includes a transverse aperture, which is positioned in line with the apertures (102.2.1, 102.3.1) of the side walls (102.2, 102.3). The interlink (108) is in the form of a square bar (108.1), with a rounded outward bulge around the position of the transverse aperture.

It is to be appreciated that the interlink (108) permits swivelling of connected support links (100) in a substantially horizontal plane (in one axis) only.

The support link (100) includes an axle extending through the apertures (102.2.1, 102.3.1) of both sidewalls (102.2, 102.3), the first pairs of co-axial rollers (104) and through the aperture of the interlink (108). The axle is in the form of a transverse horizontal axle.

One end of the axle is fixed to the first sidewall (102.2) by means of a clip, such as a circlip, and another end of the axle extends past an operative outer side wall (102.3) and is fixed to the guide element (110) by means of a clip, such as a circlip.

Figure 7:
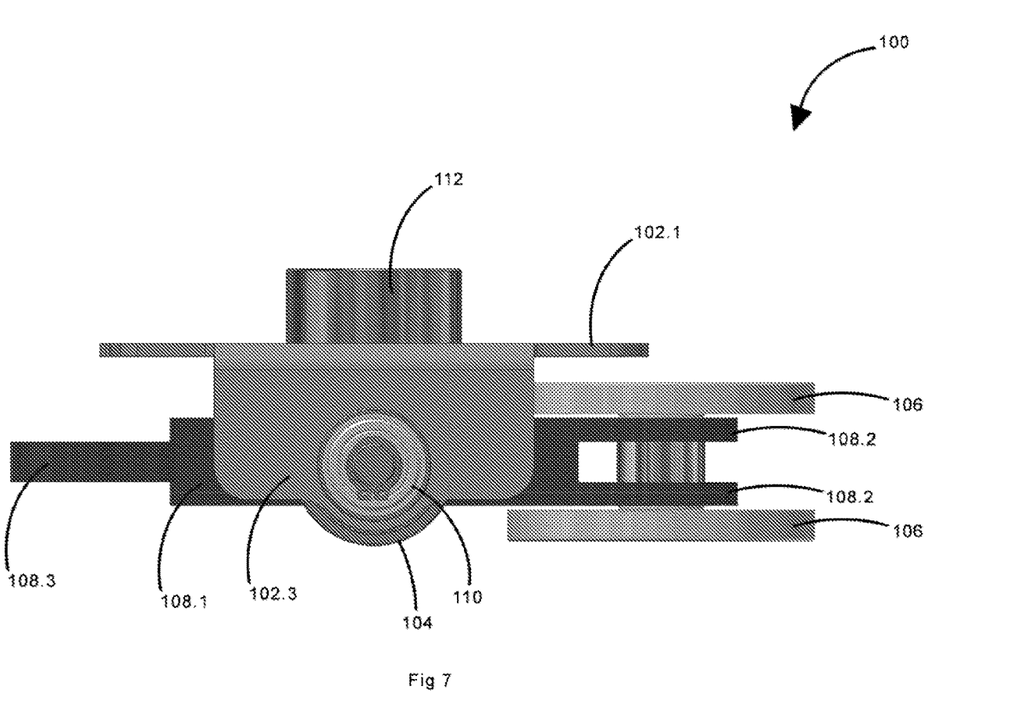
FIG. 7 shows a three-dimensional view of the support link from one side.
Figure 8:
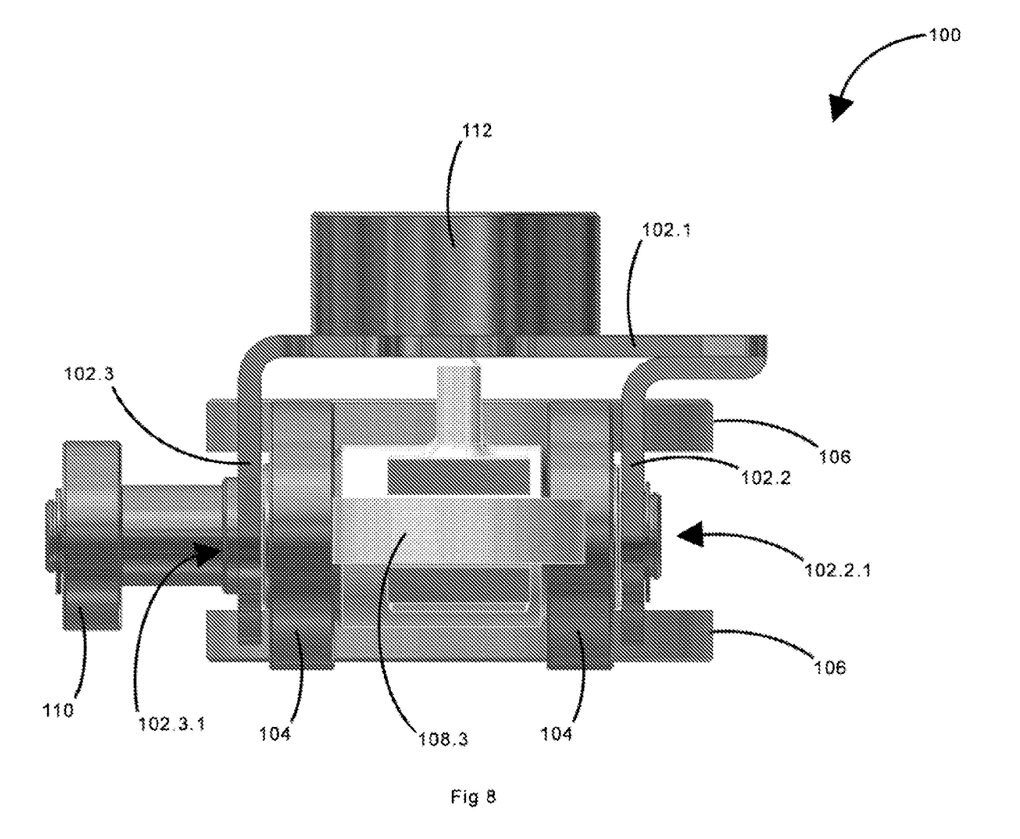
FIG. 8 shows a three-dimensional view of the support link from one end.
Figure 9:
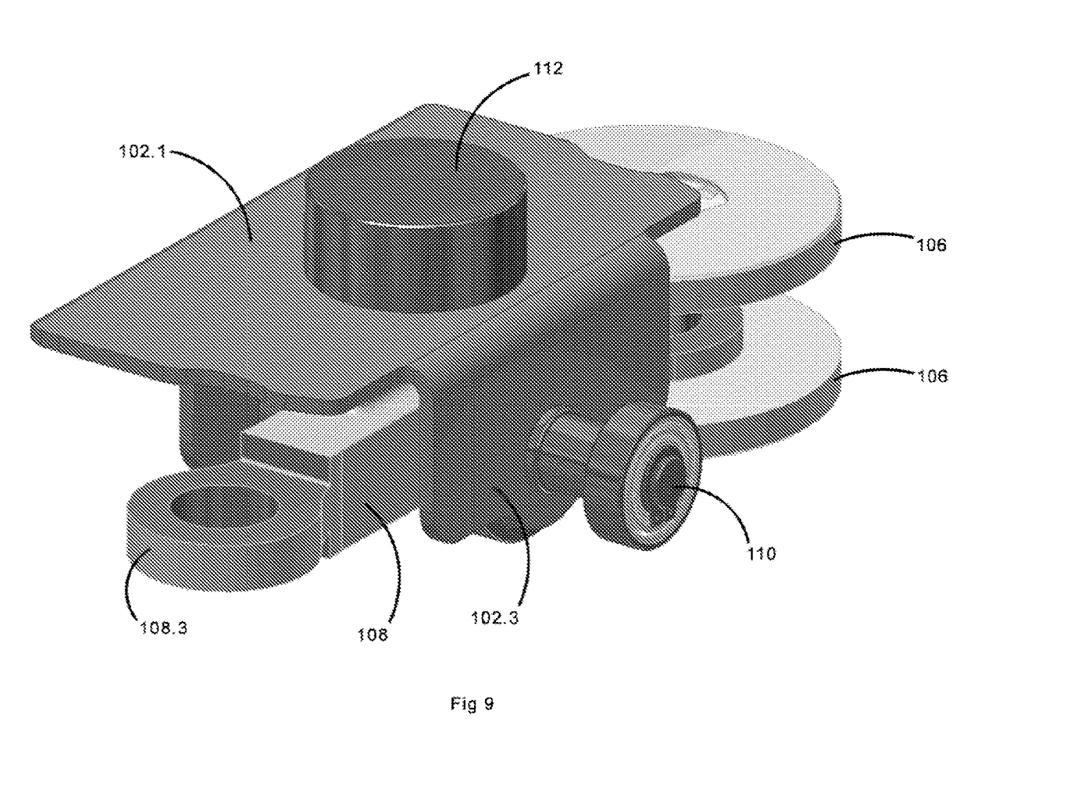
FIG. 9 shows a three-dimensional view of the support link from above.
Figure 10:
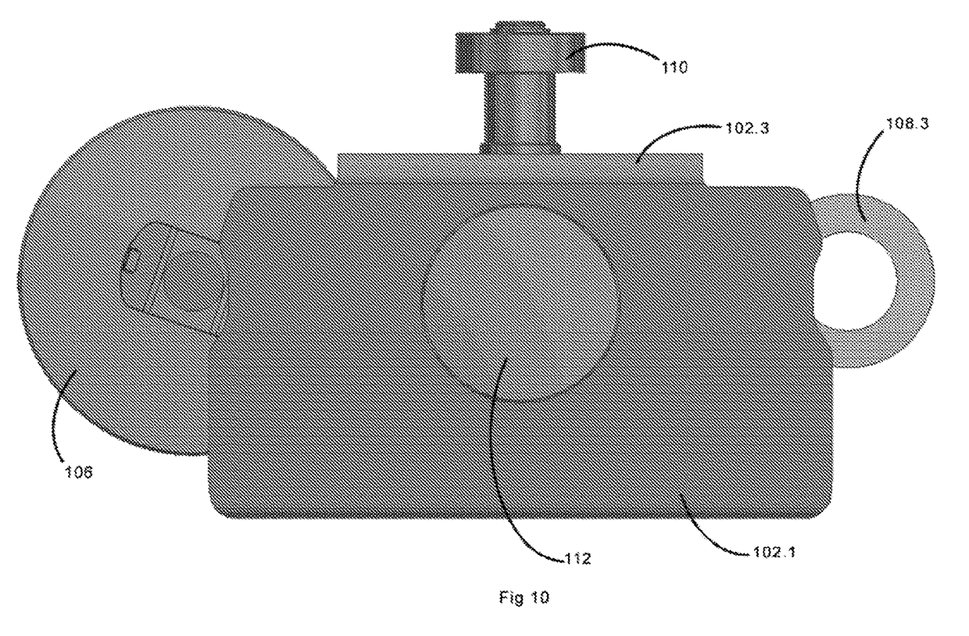
FIG. 10 shows a top view of the support link.

As best shown in FIG. 7, the interlink (108) includes a coupler at each end, for connecting to a matched interlink of an adjacent support link. A first end includes a double coupler (108.2) in the form of two co-axially spaced apart ring members, and the second end includes a single coupler (108.3) in the form of a single ring member.

The second pair of co-axial rollers (106) are connected to the double coupler (108.2). One roller (106) is positioned above one of the circular members (108.2) and the other roller (106) is positioned below the other circular member (108.2), such that the double coupler (108.2) is sandwiched between the two rollers (106). The rollers (106) and double coupler (108.2) are connected via a vertical axle. In, use a single coupler (108.3) from an adjacent support link (100) is inserted between the two co-axial ring members of the double coupler (108.2), and connected via the vertical axle to each other and the pair of rollers (106).

The support links (100) are arranged in a chain (18) such that their guide elements (110) are on an operative outer side of the chain (18), for running inside the lipped C-channel (24). Their first set of rollers (104) are positioned operatively vertical, to allow them to run on the base (14, 16) of the support frame (12). Their second set of rollers (106) are positioned operatively horizontal, to allow them to roll against the outside of the lipped C-channel (24). The planar platforms (102.1) of the carriers (102) are aligned, to allow an edge of the conveyor belt (50) to be supported on an operative inner edge of the platforms (102.1).

The inventor believes that the invention provides a new support link, which when a plurality are connected together, provides a chain which is driven and the support link providing a carrier to support a self-stacking spiral conveyor.

The invention claimed is:

1. A support link for a self-stacking spiral conveyor belt, comprising
   a carrier on which a self-stacking spiral conveyor belt is supportable;
   a drive interface, which in use can be driven by engaging with a driver mechanism;
   a set of orthogonally arranged rolling elements connected to the carrier, in which each rolling element of the set of orthogonally arranged rolling elements comprises a pair of co-axial rollers, in use to guide the carrier along a conveyor path; and
   an interlink, mountable onto the carrier, the interlink includes at least one coupler, such that the interlink is connectable to a matched interlink of an adjacent support link to form a chain.

2. The support link as claimed in claim 1, in which the interlink is in the form of an elongate member, and in which the interlink includes a coupler at each end, for connecting to a matched interlink of an adjacent support link.

3. The support link as claimed in claim 1, in which the rolling elements are connected to the carrier via the interlink.

4. The support link as claimed in claim 1 in which the set of orthogonally arranged rolling elements comprises a first pair and a second pair of co-axial rollers, in which the first pair of co-axial rollers is orientated in order for a rotational axis thereof to be perpendicular to a longitudinal length of the carrier, and in which the second pair of co-axial rollers is orientated in order for a rotational axis thereof to be perpendicular to both the rotational axis of the first pair of co-axial rollers and the longitudinal length of the carrier.

5. The support link as claimed in claim 1, which includes a guide element for engaging with a guide path, in use to retain the support link on the conveyor path.

6. The support link as claimed in claim 5, in which the guide element includes a roller movable in the guide path, for guiding the support link along the conveyor path.

7. The support link as claimed in claim 5, in which the guide element includes a projection, which extends transversely from the carrier; and having a roller attached to an operative outer end of the projection, for guiding the support link along the conveyor path.

8. The support link as claimed in claim 1, in which the drive interface is provided on the carrier.

9. The support link as claimed in claim 8, in which the carrier includes a planar platform and in which the drive interface is mounted onto the planar platform of the carrier and is in the form of a projection extending upwardly from the planar platform.

10. The support link as claimed in claim 1, in which the drive interface is shaped and dimensioned to be capable of being driven by a drive gear connected to a motor, to drive the support link along the conveyor path.

11. A support chain for a self-stacking spiral conveyor belt, which includes
a plurality of support links, as claimed in claim 1, connected to each other to form a continuous loop.

12. The support chain as claimed in claim 11, in which each support link includes a guide element on one side of the carrier, and the support links are arranged in a chain such that the guide element of each support link is on an operative outer side of the chain, for engaging a guide path.

13. The support chain as claimed in claim 11, in which the drive interface of each support link is shaped and dimensioned to be capable of being driven by a drive gear connected to a motor, to drive the support link along the conveyor path.

14. A conveyor belt supporting installation for a self-stacking spiral conveyor belt, which includes
at least one support chain having a plurality of support links connected to each other to form a continuous loop, as claimed in claim 11, for supporting an edge of a conveyor belt thereon;
a supporting frame defining a conveyor path, on which the support chain is movable; and
at least one motor driving the chain by means of a driver mechanism interacting with the drive interface of the support links of the support chain.

15. The conveyor belt supporting installation as claimed in claim 14, in which the supporting frame defines the conveyor path and is used to support a helically arranged conveyor belt tower or stack, and in which the supporting frame is in the form of a track having an outer rail and an inner rail spaced from each other to support the conveyor belt between the two rails.

16. The conveyor belt supporting installation as claimed in claim 15, in which the supporting frame includes a section supporting a base of a helical path of the conveyor belt, and a return section where the motor is located and the support chain is driven.

17. The conveyor belt supporting installation as claimed in claim 16, which includes two support chains, one running on the outer rail and the other running on the inner rail, and in which each rail includes a base and a guide path defining an outer side wall of each rail.

18. The conveyor belt supporting installation as claimed in claim 17, in which each support link in the support chains include a guide element, and the support links are arranged in the chains such that the guide element of each support link is on an operative outer side of the chain, for engaging the guide path, the guide path being in the form of a lipped C-channel positioned on an operative outer side of the base, in use, in which a guide elements run, to maintain the support links of the chains on the conveyor path.

19. The conveyor belt supporting installation as claimed in claim 17, in which the drive interfaces of each support link is shaped and dimensioned to be capable of being driven by a drive gear, and in which the conveyor belt supporting installation includes two motors, each located at the return section of the outer and inner rail respectively, and operable to drive the support chains via the driver mechanism, in the form of a drive gear engaging drive interfaces of the support links.

* * * * *